United States Patent [19]

Karras

[11] 3,793,490

[45] Feb. 19, 1974

[54] DIAL TONE DELAY MONITOR AND RECORDER

[76] Inventor: Ernest C. Karras, 1643 N. Natoma Ave., Chicago, Ill. 60636

[22] Filed: Dec. 18, 1972

[21] Appl. No.: 316,352

Related U.S. Application Data

[63] Continuation-in-part of Ser. No. 188,757, Oct. 13, 1971, abandoned.

[52] U.S. Cl. .................. 179/175.2 R, 179/175.2 C

[51] Int. Cl. .......................................... H04m 3/22

[58] Field of Search 179/175.2 R, 175.2 C, 175.1 R

[56] References Cited

UNITED STATES PATENTS

| | | | |
|---|---|---|---|
| 2,405,339 | 8/1946 | Willis | 179/175.2 R |
| 3,328,538 | 6/1967 | Germanton | 179/175.2 C |
| 3,400,228 | 9/1968 | Bubber | 179/175.2 C |

OTHER PUBLICATIONS

Instruction Manual for Model TTS-42 A Slow Dial Tone Counter, Northeast Electronics Corp., Sept. 1971

Model TTS 42 Slow Dial Tone Detector Northeast Electronics Corp., Oct. 1969.

*Primary Examiner*—Kathleen H. Claffy
*Assistant Examiner*—Douglas W. Olms
*Attorney, Agent, or Firm*—Alter, Weiss, Whitesel & Laff

[57] ABSTRACT

An electronic scanner is connected to a vacant line in each linefinder group of a telephone exchange. The scanner sequentially and individually places a call in each group. If dial tone fails to appear within a given time period, a suitable data record is made to indicate that a dial tone delay has occurred. The data may be analyzed by group or for an individual linefinder group, and electronic accumulators may automatically feed such data into a central processor.

20 Claims, 4 Drawing Figures

DIAL TONE DELAY MONITOR AND RECORDER

This is a continuation in part of my copending application, Ser. No. 188,757, filed Oct. 13, 1971, now abandoned, entitled "Dial Tone Delay Monitor And Recorder."

This invention relates to automatic service monitoring and data collecting for telephone systems and, more particularly, to means for monitoring the operation of linefinders and related types of equipments.

Automatic telephone switching systems provide means for seeking and finding a subscriber line having an unanswered calling condition thereon, such means being herein called "linefinders" regardless of whether they are crossbar, step-by-step, electronic, computer controlled, or other equipment.

It has been found that linefinders do not have to be provided on a basis which allows all subscribers to place simultaneous calls, since, on the average, not over 7 percent of the lines will have a calling condition thereon at any given time. As with all statistics, there are deviations from the average; however, such deviations may also be predicted on the basis of a stated grade of service, i. e. the percentage of time that an all-finders-busy condition is encountered. If the sample is large enough, the deviations are relatively minor; whereas, if the sample is small, or if the telephones characteristic of an office is changing, the deviations become increasingly important.

For example, on the average, seven subscriber lines of each one hundred home telephones are busy simultaneously regardless of the number of lines in a group. In order to provide service of a grade wherein an all-finders-busy condition is encountered no more than 1 percent of the time, fourteen linefinders per group may be provided if the lines are divided into groups of one hundred lines each. For the same grade of service to the same class of lines, only 24 linefinders per group need be provided if the lines are divided into 200 line groups. If the type or the number of lines per group changes, the efficiency of the system also changes.

For example, a small community may suddenly grow larger; or an area of home owners may change to become an area of business establishments. Other types of changes may occur seasonably, as when tourists flock to a beach in the summer. Accordingly, a time may come when the originally installed number of linefinders is no longer adequate for the new traffic patterns.

If an office has too few linefinders, there is an unduly long delay between the time when a call is placed and the time when dial tone is returned to the subscribers. Accordingly, the quality and efficiency of an exchange may become known from monitoring the time required for dial tone to be returned to the calling subscriber.

When there is an unduly long delay before dial tone is returned, it becomes necessary to analyze the switching system to identify the source of delay. Usually, this analysis is made to pinpoint the exact linefinder group which is giving trouble. Sometimes data concerning such troubled group is sent to a central processor or an automatic readout terminal, if those facilites are provided. One difficulty here is that many linefinder groups require much identification equipment. Therefore, the burden of pinpointing the source of delayed dial tone becomes expensive. This is especially true in large systems with many widely scattered central offices.

Accordingly, an object of the invention is to provide new and improved means for automatically monitoring linefinders and recording the number of delays in return of dial tone. Here, an object is to monitor the quality of service given by linefinding equipment, and to give a delay dial tone signal when any equipment in the group fails to respond promptly enough. In this connection, an object is to give optional forms of recording wherein the dial tone delays of an entire office is recorded either in bulk or by individual finder group records.

Another object of the invention is to provide a traffic recorder which may interface with any type of switching equipment. Here, an object is to record, at electronic speeds, without regard as to whether the driving equipment is old or new, fast or slow, standard or not standard. In this connection, an object is to limit noise caused in electronic circuits by electromechanical devices. Yet another object is to provide for giving this service despite changing conditions in a linefinder group.

Still another object of the invention is to provide for sturdy and reliable operation, with the precision of high quality components at all points in the system.

Yet another object is to provide low cost display means for reading out an identity of the source of dial tone delay. Here, an object is to provide great flexibility wherein either the group may be found directly or by a process of elimination, depending upon the amount of expense which is acceptable to the operating company. In this connection, an object is to provide alternative means for manually reading a display, automatically printing or perforating records, or peripherally feeding information to a central data processor.

In keeping with an aspect of the invention, these and other objects are accomplished by providing an electronic scanner connected to a vacant line in each linefinder group. The scanner sequentially places a call in each group. If dial tone fails to appear within a given time period, a suitable record is made to indicate that a delay has occurred.

To pinpoint any given source of dial tone delay, a simple peg board matrix is provided for making optional connections either to groups of linefinder groups or to individual linefinder groups. This way, the pegs may be initially inserted in the matrix and groups of linefinder groups may be monitored. When a defective group of linefinder groups is found containing a source of delayed dial tone, the pegs may be arranged in the matrix to monitor individual linefinder groups within the defective group. This way, the trouble may be traced to the one defective linefinder group.

The nature of a preferred embodiment of the invention may be understood best from a study of the attached drawings wherein.

Figure 1:
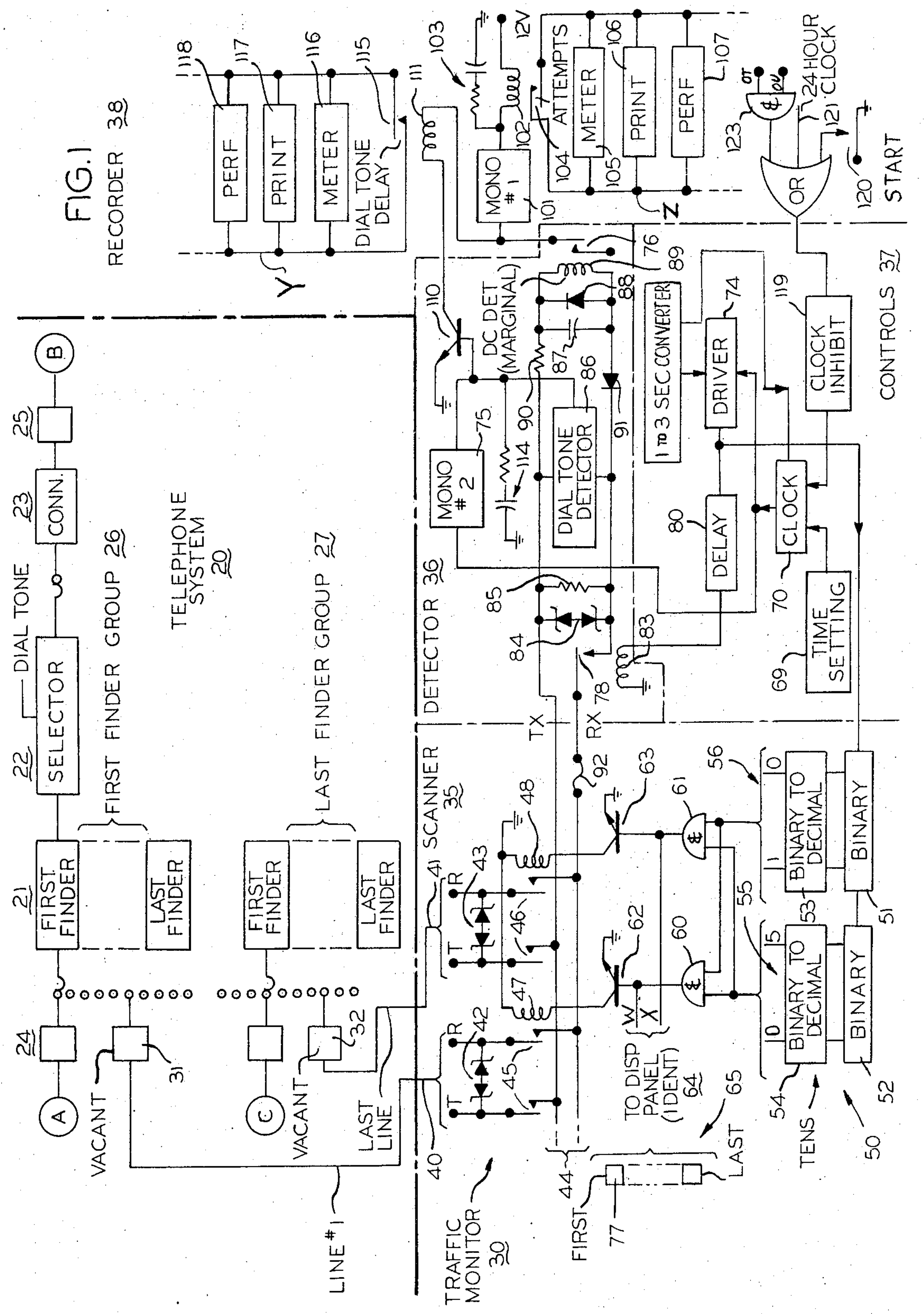
FIG. 1 is a block diagram which shows a preferred embodiment wherein the inventive monitor is used in conjunction with an exemplary step-by-step telephone switching system.

FIG. 1 shows a typical step-by-step telephone system 20, comprising finders 21, selectors 22, and connectors 23. Each subscriber station A, B, C, et seq. is connected to the finder and connector banks via conventional line circuits 24, 25.

As those who are skilled in the art know, the finders are divided into groups 26, 27 comprising, say, fourteen finders per group, with the banks connected to the same group of subscriber lines. Since the finders are functionally identical in each group, the first idle and available finder seizes any unanswered calling line. The next calling condition causes the next idle and available finder to operate. Hence, there is the same mix of subscribers, e. g., all home owners, throughout any one group, and they all receive the same grade of service. However, there may be a different mix of subscribers, e. g. 50 percent home owners and 50 percent shopkeepers, in different ones of the various groups, and the grade of service may be different from group to group. The invention is designed to detect and record these differences.

Briefly, according to the invention, a traffic monitor circuit 30 is connected to each linefinder group in telephone system 20. Connections are made via any vacant set of conventional subscriber terminals in a linefinder bank. Thus, in the first finder group 26, the monitor 30 is connected to line circuit 31, which receives the same grade of service as that given to subscriber A and all other subscribers in the group. In the last finder group 27, monitor 30 is connected to line circuit 32 which receives the same grade of service as that given to subscriber C, and all in his group.

Accordingly, the monitor circuit 30 may be programmed to place a sufficient number of calls in each linefinder group to insure receipt of an average grade of service, shared by all members of that group. As each call progresses, the monitor circuit 30 records any and all delays in dial tone. Hence, the recording indicates the grade of service given to all subscribers because each shares the same equipment as line circuits 31, 32, respectively. Similarly, the service given every other linefinder group is monitored in a like manner.

The traffice monitor circuit 30 is here divided into its major subcircuits by dot-dash lines, as follows: scanner 35, detector 36, controls 37, and recorder 38.

The scanner includes tip and ring conductors T, R, connected to each of the linefinder groups. For example, tip and ring conductors 40 are connected to the first group 26 and conductors 41 are connected to the second group 27. A pair of back-to-back zener diodes 42, 43 are coupled across each tip and ring pair to absorb transient voltage spikes. Each line is connected to tip and ring test busses 44 via individually associated glass reed relay T and R contacts 45, 46. These reeds are controlled by suitable windings 47, 48. It should be understood that any number of similar reed relays will be provided.

An electronic scanner 35 sequentially operates the reed relays one at a time. In greater detail, the scanner comprises units and tens binary counters 51, 52, driven by a system clock 70. Suitable decoding means 53, 54 convert the binary count into a decimal output, with tens output terminals 1–5 at 55 and units output terminals 1–0 at 56. Any suitable number of outputs may be provided; the fifty outputs here shown provide traffice monitoring capacity for a 10,000 line office having two hundred lines in each linefinder group.

Suitable AND gates 60, 61 are energized by the tens and units output terminals 55, 56 for each of the 50 outputs here shown. Only the first and last AND gates are here shown; any suitable number may be provided. Responsive to the output of each AND gate, an individually associated driving transistor 62, 63 switches on to energize the reed relay windings 47 or 48. Thus, as here shown, relay 47 operates its contacts 45 during the first time period in each line scan, and relay 48 operates its contacts during the last time period in the scan. Any suitable number of other relays (not shown) may be operated during the intermediate cycle periods in the scan. Also responsive to the outputs of these AND gates a distributor panel 64 feeds a signal to any suitable display means 65, individually associated with each linefinder group. The output of this display means indicates the group being tested. Therefore, that group identity information may also be recorded, if this feature is provided, as described below in connection with FIG. 3.

Figure 2:
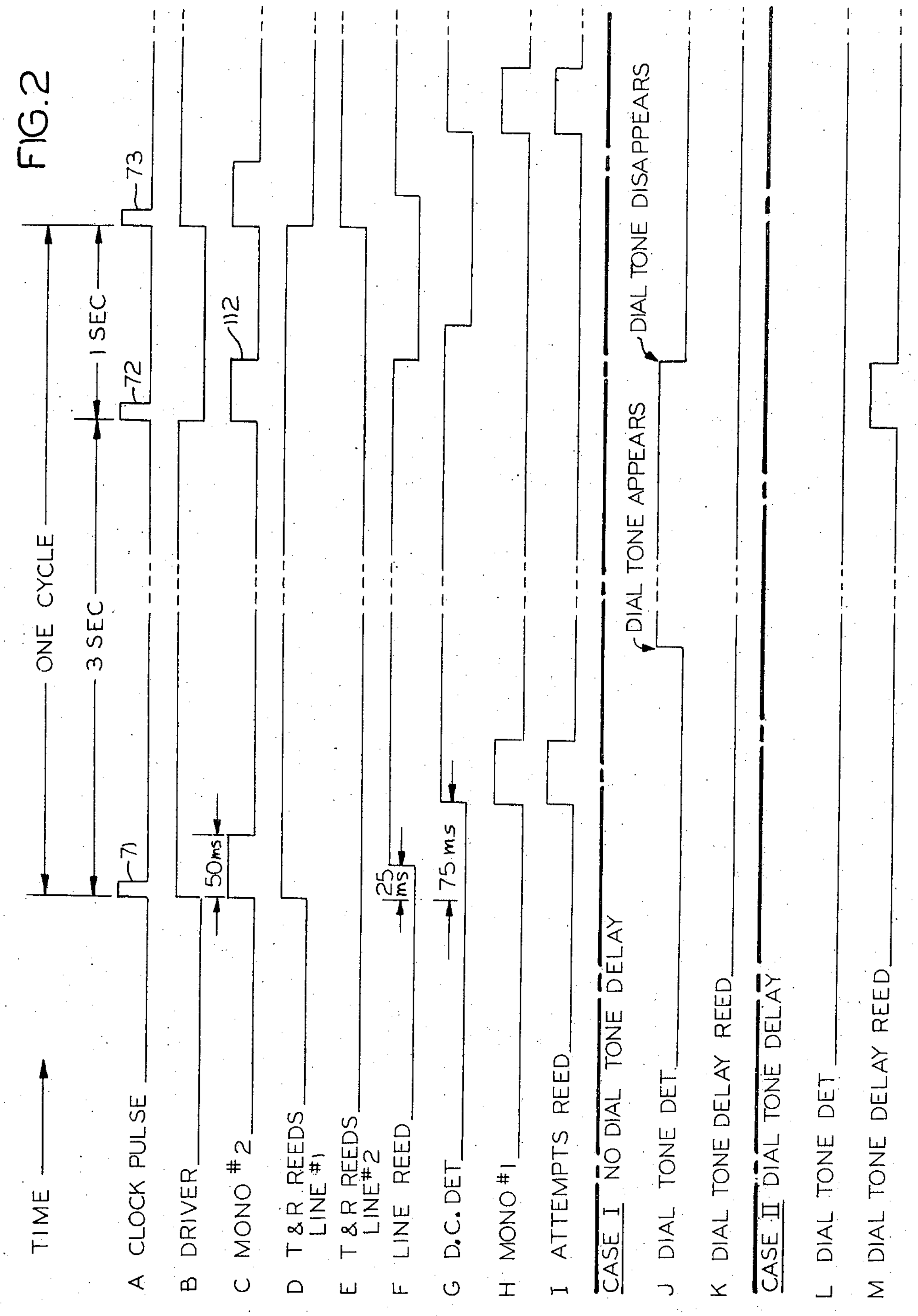
FIG. 2 is a graphical representation of the system timing.

The timing of the traffic monitor circuit 30 is seen in FIG. 2. In greater detail, a free running clock 70 asymmetrically provides output pulses 71–73 every third and fourth second, as shown in FIG. 2A. The first pulse 71 starts the recorder cycle during a test of line No. 1. The second pulse 72 closes a gating time period, during which dial tone must be received if an acceptable grade of service is being given. Any dial tone appearing after the pulse 72 is a "delayed dial tone." This cycle may be varied at will by suitable switches on a time setting circuit 69. Thus, the acceptable period may be made longer or shorter, at the operator's will. The clock 70 continues to generate these pulses as long as the traffic monitor 30 is switched on.

The clock pulse 71 causes a monostable circuit 75 to measure a timer period (FIG. 2C), which is without effect at this time since contacts 76 are now open. The clock pulse 71 also causes a driver 74 to step (FIG. 2B) the binary counter 51, 52 off a home position 0, 0 to initiate the test of line No. 1 which is identified at output terminals 55, 56 by an energization of the leads 0-tens and 1-unit leads.

As soon as the leads 0, 1 are energized, the AND gate 60 energizes winding 47 and individual identifier 77, if provided. The line No. 1 T and R reeds 45 close (FIG. D).

Means are provided for preventing sparks and other transients at the T and R reeds 45 when they close. More particularly, since the test line contacts 78 are open at this time, the contacts 45 close unenergized circuits to individualize the line No. 1 tip and ring leads to the test busses 44. That is, the contacts 45 close responsive to an occurrence of a clock pulse from clock 70. Simultaneously, the driver 74 pulses a delay line 80. The monostable circuit 75 is measuring a time period of approximately 50-ms (FIG. 2C), without effect. After 25-ms (FIG. 2F), the delay line 80 energizes a line relay winding 83 and thereby close the contacts 78. Note that this contact 78 closes the loop across tip and ring conductors T and R to allow current flow, only after contacts 45 have previously closed on an open circuit. Therefore, all sparks and any other transients occur at the time when contacts 78 close. Thus, the entire expense of spark protected contacts may be absorbed in this one contact 78, and the individual T and R contacts 44, 46 may have a very low cost. This gives the highest quality of operation with the lowest cost in components.

The loop is bridged by a spark protection circuit 84, a large resistor 85, a dial tone detector 86, a capacitor 87, a diode 88, and a D.C. detector marginal relay winding 89. The spark protection circuit 84 is preferably in the form of two back-to-back zener diodes. The resistor 85 completes a bridge across the loop and is large enough to swamp out any variations between the impedance of associated equipments. The current flow occurring when the loop is completed is a demand for a linefinder. Also, the circuit is balanced by resistor 85 so that it may be used with either balanced or unbalanced finder equipment. Hence, the traffic monitor may be used with virtually any kind of equipment.

The components 87–91 provide an important noise reduction function. In greater detail, resistor 90 is current limiting, and it reduces the voltage across the winding 89 to allow a big variation in the applied line voltages. The capacitor 87 makes the relay 89 slow releasing by supplying a holding current while line current is interrupted during change over and switch through in the telephone switching system. The diodes 88 and 91 force the capacitor 87 to discharge through the windings 89 only. No negative spikes may reach and discharge the lower side of the capacitor 87, as viewed in the drawing, thereby affecting the relay operations. The net effect of this circuitry is that the D. C. detector relay 89 holds over minor current fluctuations and interruptions on the line which might result from change over or switch through exchange of energy between repeat coils and line noise.

The D.C. detector relay 89 is able to function properly on, say, a five volt variation on the line. This insures reliability despite wide fluctuations on the tested line. For example, some equipments use 500 ohm line relays. As a result, line voltage swings over a wide range. The detector is immune to these wide variations in line voltages since resistor 90 swamps out the variations.

Another function of these components, together with the resistor 85, is to provide a proper termination impedance to the line 40.

It should be noted that the monostable No. 2 circuit 75 times out (FIG. 2C) before the D.C. detector relay 89 can operate (FIG. 2G). Therefore, relay contacts 76 are open for the entire period while the circuit 75 has an output. Hence, at this time, the monostable circuit 75 cannot cause any kind of response in relay 111.

Means are provided for starting a timing cycle responsive to the closure of the loop across the tip and ring conductors. Stated another way, the circuit measures the time required for the return of dial tone after a simulation of a calling line going off hook. Normally, a line goes off hook and places a demand for service by closing a bridge across the loop. (Here the resistor 85 is the bridge placed across the loop). The marginal relay 89 has charcteristics such that it operates when the finder in group 26 battery on the line, but only if the total impedance of the line is within a normal operating range. Hence, the operation of the relay 89 detects the closed D.C. loop conditions on line No. 1.

The traffic monitor registers an "attempt," responsive to a found line condition, i. e. the condition wherein the linefinder places battery across the line. In greater detail, the contacts 76 close to start the timing cycle of the second timer and monostable circuit 101 (FIG. 2H). Thereafter, the winding 102 of an "attempt" relay is energized for a period of 50-ms (FIG. 21). An integration circuit 103 prevents any response to short transients, such as might be caused by contact bounce. Thus, this integration circuit makes the electronic traffic monitor compatible with electromechanical equipment. Otherwise, certain changeover switching in, say, finder 21, could be interpreted as two separate calls in the traffic monitor 30.

In any event, the relay 102 operates (FIG. 21) for a period of 50-ms responsive to the output of the monostable circuit 101. Responsive thereto, contacts 104 close to register the attempt in any suitable manner. For example, a meter 105 may simply keep a runing bulk total of the attempts made; or a printer 106 or perforator 107 may record detailed information concerning each attempt. In this case, the identification device 77 may identify finder group 26 as being the one connected to serve the call. A suitable toll ticketing type of clock and calendar circuit may also be called upon to record time and data of the attempt.

The next event depends upon whether dial tone appears promptly. For example, in the step by step equipment of FIG. 1, a selector 22 returns dial tone through the finder 21 as soon as the selector equipment is ready to receive dial signals. In cross bar and other common control equipment, dial tone is returned from a register as soon as it is ready to receive dial signals. If the system is operating satisfactorily, the dial tone should be returned within three seconds, assuming that the position of the clock pulse 72 is so adjusted. Thus, two possiblities are shown in FIG. 2: Case I, where dial tone is received within three seconds after the demand for and service is placed upon the finder, and Case II, where dial tone is not returned within these three seconds In Case I (Dial Tone Returns), the dial tone detector 86 (FIG. 1) gives an output signal when the dial tone appears (FIG. 2J) on the tip and ring conductors of line No. 1. Any suitable tone detector may be used, such as those commonly used to detect the tones of the multifrequency push button dial, for example. The output of tone detector 86 is applied, as an inhibit signal, to the base of a transistor 110. The transistor 110 is fully inhibited and cannot thereafter turn on, regardless of any signals which it may receive. Since the transistor 110 cannot turn on, a relay 111 cannot operate, and no signal can be given to indicate the dial tone has been delayed.

The clock 70 produces pulse 72 (FIG. 2A) to enable detection of a delayed dial tone. The circuit may be adjusted so that pulse 72 occurs about three seconds after the clock 70 produced the pulse 71, to bridge the line and place an unanswered calling line demand upon the finder group. Responsive to the clock pulse 72, the driver 74 turns off (FIG. 2B), and the monostable No. 2 circuit 75 produces a 50-ms output signal 112 (FIG. 2C). After 75-ms following clock pulse 72, the delay circuit 80 deenergizes line relay 83, and the loop is opened at contacts 78 to release the linefinder and to remove dial tone. Note that the opening of the loop at contacts 78 occurs before the opening of tip and ring contacts 45. Therefore, any sparks appear across contacts 78 and not across contacts 45. Also, shortly after the loop opens at the contacts 78, the D.C. detector relay 89 releases (FIG. 2G). Since the dial tone detector 86 held an inhibit on the transistor 110 from a period starting before the appearance of the three second clock pulse 72 until after the monostable No. 2 circuit 75 timed out (112), no delayed dial tone signal was recorded (FIG. 2K).

Case II (FIG. 2) is the situation where dial tone does not appear within a three second period after the demand for service which began with clock pulse 71 (FIG. 2A) and the resulting loop closure at the contacts 78. In greater detail, there is no dial tone detector output from the circuit 86 (FIG. 2L). Hence, no inhibiting signal is applied to the base of the transistor 110. In three seconds after the demand for finder service, the clock pulse 72 (FIG. 2A) appears and the monostable No. 2 circuit 75 turns on. An integrator circuit 114 absorbs any transients or other noise out of the electromechanical equipment. When the transistor 110 turns on responsive to the output of the monostable circuit 75, ground is applied to the relay winding 111. Since the loop is closed at this time, the D.C. detector relay 89 is held operated by the central office battery applied through the finder 21, line 40, contacts 45, conductors 44, and contacts 78. Therefore, contacts 76 are closed. Hence, there is an AND condition of a closed loop and an absence of dial tone after three seconds. Relay 111 operates its contacts 115 (FIG. 2M). A meter 116 makes a bulk record that dial tone has been delayed. Also, a printer or perforator 117, 118 could make a record of the statistical details surrounding the delay, such as time, day and identity of finder group.

After the 75-ms delay following clock pulse 72, the circuit 80 releases the relay 83 to open the loop at contacts 78 and terminate the testing of the finder group 26 and changes the time base of the three second timer to one second.

In one second, the clock pulse 73 appears to start a new test cycle on the second finder group. Responsive thereto, the driver 74 drives the binary counter 51 to step the binary to decimal converter 53, 54 and to energize the next AND gate (not shown), which is similar to gate 60, while deenergizing gate 60. When AND gate 60 switches off, the relay 47 opens contacts similar to 45 to prepare for testing the next finder group. This occurs while line contacts 78 are open to prevent sparks.

The events triggered by clock pulse 73 are the same as those triggered by the clock pulse 71.

In a similar manner, every finder group is tested until the scanner 50 reaches the last group 27. There AND gate 61 doncuts, and the relay 48 closes, the contacts 46 to connect the tip and ring conductors of the last line to the traffic monitor 30. The test is repeated, and then the scanner 50 steps to the 0 0 or home position.

The next event depends upon how the test came to be conducted in the first place. In greater detail, there are two ways to cause a traffic monitor study to be run. First, there is a manual START key 120. If closed, it removes from the clock 70 an inhibit signal normally applied by an inhibit circuit 119. Therefore, the clock 70 operates as a free running device and cycles repeatedly, testing all finder groups over and over until the start key 120 is again opened.

A second way to start the testing is by a 24 hour clock 121. Here, the clock is set for the busiest traffic time in the day, when the telephone system 20 carries a maximum load. If a delayed dial tone is likely during any period of the day, it will be then.

Regardless of which method is used to start the testing, an AND circuit 123 controls the stopping of the test cycle when the scanner 50 returns to its home position where the zero tens and zero units (O O) condition occurs. Then the AND gate 123 applies a signal to the clock inhibit circuit 119. The clock 70 stops, and testing is complete.

If bulk metering is used, the readings in meters 105 and 116 are compared. If the reading at 116 is more than one per cent of the reading at 105, the grade of service is less than the nominally desired 0.01 grade of service. Therefore, more finder equipment is required. The interpretation of the indicated grade of service, in terms of amount of equipment required, is within the skill of a traffic engineer.

If a perforator or printer 106, 107, 117, 118 is provided, the added information is recorded to tell the traffic engineer exactly where the service requires improvement.

Figures 3, 4:
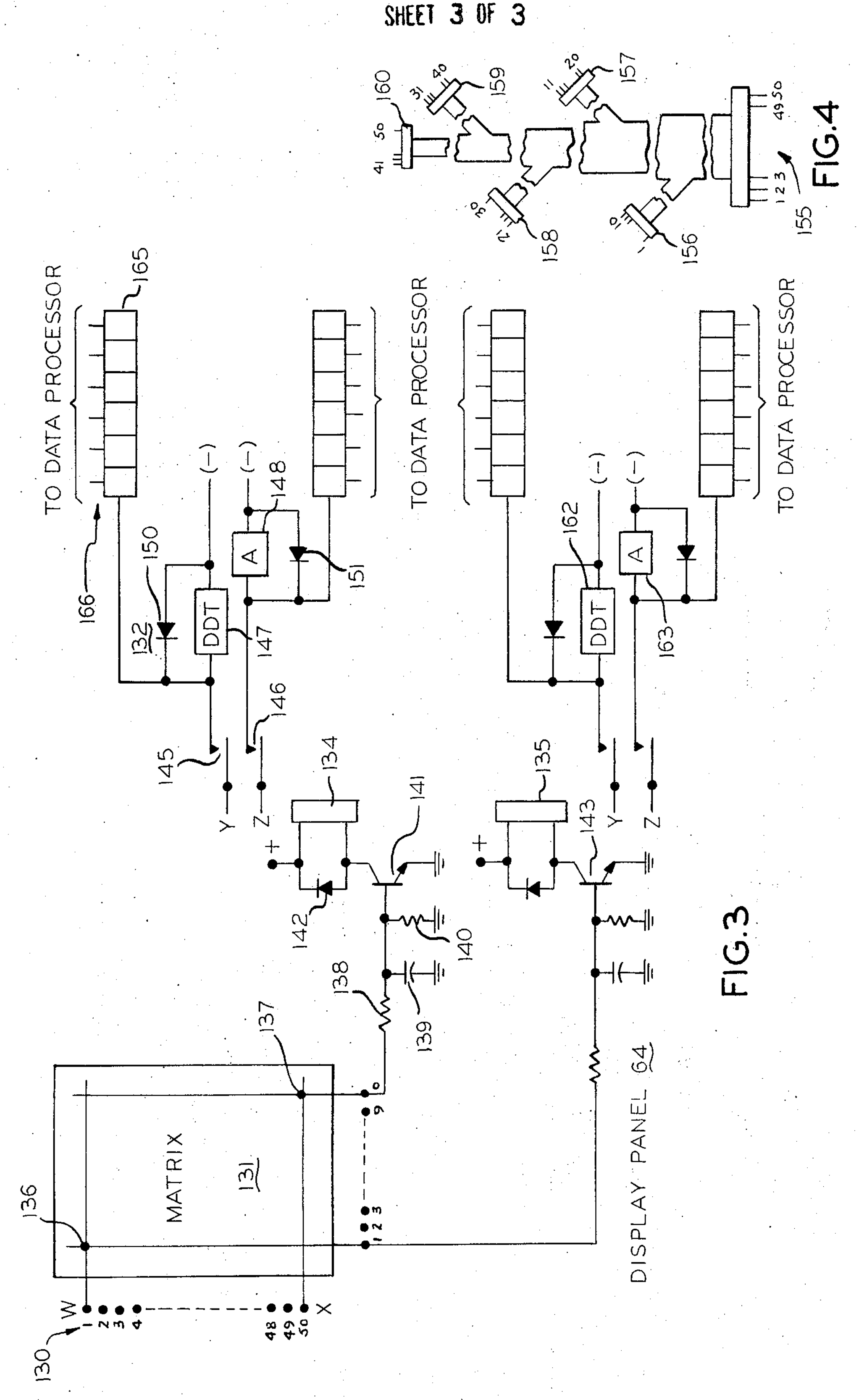
FIG. 3 is a schematic circuit diagram which shows a matrix for optionally distributing the display panel readout to any of the monitored linefinder groups.
FIG. 4 schematically shows a cable harness for giving up to 100 percent service monitoring.

FIG. 3 schematically shows the display panel 64 which is used to identify the particular linefinder group or group of linefinder groups which are being monitored at any given time. This display panel 64 includes inlet terminals 130, a matrix plug or peg board 131, and a plurality of meters 132. Each of the inlets 130 is individually associated with one of the linefinder groups 26, 27 (FIG. 1). Thus, the first and last terminals 1 and 50 are here shown as being connected to the wires W and X in FIG. 1. Likewise, all intermediate ones of the terminals 130 are connected to intermediate AND gates similar to 60, 61 (not shown) in FIG. 1.

The outlets of matrix 131 are individually connected to operate each of ten associated meter control relays 134, 135. Hence, it should be apparent that any one of fifty different line-finder groups may be connected to operate any one of ten different meter control relays 134, 135, by inserting a peg to close a selected cross point matrix switch. For example, the cross points 136, 137 are marked to indicate that wire W at inlet 1 is connected through outlet 1 to control relay 135 and that wire X at inlet 50 is connected through outlet 0 to control relay 134.

The matrix 131 may be constructed in any suitable manner. It is believed that any of many commercially available matrices may be used wherein a plastic plug may be inserted into a hole at a cross point in order to close a set of contacts. However, other electrically controlled matrices may also be used.

The relay control circuits 134, 135 comprise a voltage dropping resistor 138 which swamps out any variations to input voltage. Capacitor 139 provides a noise by-pass to ground. Resistor 140 provides for a base bias leakage. Transistor 141 is used in a common emitter electronic switch configuration with a parallel circuit of winding 134 and a reverse EMF protection diode 142 in the collector load position.

It should now be apparent that whenever the AND gate 60, for example, conducts, an output voltage is applied to the base of the transistor 141 to switch it on. Likewise, the transistor 143 turns on whenever the AND gate 61 conducts. Responsive thereto, one of the relays 134 or 135 operates.

Relay 134 controls a pair of glass reed contacts 145, 146 which connects wires Y and Z, respectively, from FIG. 1 to a dial tone delay meter 147 and an attempts meter 148. Diodes 150, 151 provide reverse EMF protection around the meters. These two meters are connected in parallel with, and duplicate the functions of, meters 116 and 105 of FIG. 1. Thus, while an identified linefinder group is connected to the display panel 64 of FIG. 3, the meters 147, 148 record the information data also being recorded at 38 in FIG. 1.

The circuit of FIG. 3 may be either rack mounted adjacent the equipment of FIG. 1 or mounted in a small brief case size container to be carried to the area of the FIG. 1 equipment. Either way, the equipment of FIG. 3 is plugged into a jack (not shown) on the equipment of FIG. 1. This may be done in two ways. First, a cable harness may be provided for interconnecting all fifty wires corresponding to wires W and X. Second, a cable harness may be provided, as shown in FIG. 4, wherein one inlet plug 155 makes connections to all 50 jacks on the equipment of FIG. 1. From the plug 155, the wires fan out into five other plugs or jacks 156–160 for extending ten wires to each of five different duplicate sets of display equipment, such as the one shown in FIG. 3. For example, wires 1–10 are connected to a first display panel 64 at jack 156, wires 11–20 to a second display panel 64 at jack 156, etc. When the harness of FIG. 4 is used, there is up to a one to one ratio, and the data from every linefinder group is individually registered in its own individually associated meters 147, 148. Therefore, the troubled units are detected immediately. However, in a properly maintained office, linefinder groups do not usually encounter serious trouble under conditions where instant identification is essential. Therefore, it is desirable to provide a minimum amount of maintenance equipment which may be recycled to eliminate good equipment and thereby find the troubled equipment.

In keeping with an aspect of the invention, the user connects all fifty wires, similar to W and X, into the terminals 130. Pegs are used in matrix 131 to assign each of the meters, such as 147, 148, to monitor and record the grade of service given to each different class of service lines. For example, meters 147, 148 may be assigned to monitor the grade of service given pay stations, and meters 162, 163 may be assigned to monitor the grade of service given two-party lines. Likewise, other meters (not shown) may be assigned to monitor the grade of service on business lines, private lines, PBX lines, etc.

The system operates and the meters 38, FIG. 1, indicate that there is dial tone delay trouble someplace in the office. Then, the equipment of FIG. 3 is plugged in and pegs are inserted at the cross points matrix 131, which connect each of the 50 lines 130 to the corresponding class of service meters 132. The calls to each class of service are monitored and delayed dial tone data is recorded. Soon, the data identifies the group of linefinder groups serving one class of service as the source of the dial tone delay trouble. Thereafter, the pegs are pulled out of the matrix 131 and reinserted so that one set of meters, e. g. 147, 148, is assigned to each linefinder group in the troubled group of linefinders, to monitor and record. Soon the source of trouble is identified as an individual linefinder group.

According to a further aspect of the invention, each meter may be duplicated or supplanted by an electronic accumulator, as, for example, accumulator 165 duplicates meter 147. The output 166 of the accumulator may be connected directly into the central data processor (not shown) of the switching system. Likewise, the matrix 131 may be replaced by an electronically programable matrix which is controlled by the processor. This way, the entire dial tone delay monitoring system may be controlled by and from the processor.

The above-described traffic monitor has been built and tested with excellent results. This particular monitor was designed to measure the grade of service provided by central telephone switching offices, in promptly giving dial tone to originating subscribers. The monitor sequentially terminates the tip and ring of up to 50-test lines for the purpose of detecting dial tone delay in each of 50-line finder groups. On resetable meters, it separately registers the total number of seizures (attempts) and of delayed dial tone. A panel mounted switch enabled a selection of any convenient time periods, such as 2.0, 2.5, 3.0, 3.5 or 4.0 seconds, as the accepted interval required to give dial tone before a delayed time is recorded. A balanced broadband input is provided for interfacing with crossbar, step by step, all relay or other switching systems and to operate in connection with various frequencies of dial tone. A special strapping option enables the outputs to feed directly into most standard traffic printers for completely unattended operation. An automatic interval clock was attached to enable the collection of data only during preprogrammed periods of the day.

The particular traffic monitor of FIG. 1 fits within a portable case measuring 21 inches wide, 7 inches high, and 16 inches deep. It weighs 17 pounds without case and 30 pounds with case. Likewise, the display equipment 64 of FIG. 3 also fits into a portable case. Both of these cases are easily transportable and have clip or plug and jack ended connector wires for making quick connections.

The foregoing description is of a preferred embodiment. Therefore, changes may be made without departing from the scope and spirit of the invention. Hence, the appended claims are to be construed to cover all equivalent structures.

I claim:

1. A traffic monitor for a telephone switching system having a plurality of grouped finder-related equipments adapted to return dial tone to a calling subscriber line, said traffic monitor comprising a plurality of input connector means for connecting said monitor to individually associated vacant terminals in each of said finder groups, free running asymmetrical common control clock means, scanner means operated by said clock means for sequentially and individually connecting each of said connector means to said monitor at time based intervals and thereby originating a call to said switching system, means responsive to each originating call for detecting the appearance of dial tone as a function of time, measured by either a relatively widely spaced pair of said clock pulses or a relatively closely spaced pair of said pulses, means responsive to each of said scanner caused connections for recording at least the call attempts, and means selectively responsive to the actuation of the dial tone detector between either of the spaced pairs of pulses for recording the appearance of dial tone as a function of time.

2. The monitor of claim 1 wherein said clock means comprises a source of clock pulses for cyclically and recurringly producing said pairs of said pulses, means for adjusting the time spacing between the pulses comprising said pairs of pulses to provide a predetermined measured time period, means responsive to each first of said pair of pulses for operating said scanner to make a connection and thereby place a call, and means responsive to each second of said pair of pulses for operating the dial tone recording means whereby said time function is measured by the time space between said pair of pulses.

3. The monitor of claim 1 wherein each of said lines comprise at least one talking conductor, said connector means comprising at least one contact making device interposed in the talking conductor between each individually associated line and said monitor, means for operating said contact device to complete a line loop to said monitor, whereby closure of any of said contact making devices individualizes the associated line with the monitor, and other contact means for thereafter completing a connection in said monitor to energize said line, whereby said contact making devices close deenergized circuits including the talking conductor and all sparks occur responsive to said closure of said other contact means when said line is energized.

4. The monitor of claim 1 and D.C. detector means for detecting a flow of current in the proper direction on said line when said line is energized, said D.C. detector comprising means for limiting current to reduce the effect of any variations of electrical signals on said line, and means for holding said D.C. detector during change over and switch through in said switching means.

5. The monitor of claim 4 and means responsive to said D.C. detector for operating said attempts recorder and enabling said dial tone detector recorder, and means whereby said means responsive to said dial tone detector is operated jointly responsive to said D.C. detector enabling a signal and said dial tone detector.

6. The monitor of claim 1 and display means individually associated with said traffic monitor for identifying a troubled finder group.

7. The monitor of claim 6 and matrix means associated with said display means for changeably and selectively connecting said display means to said traffic monitor by said line-finder groups whereby the identity of a linefinder group is known from the connection made.

8. The monitor of claim 6 and means associated with said display means for electronically accumulating data relating to said linefinder groups for controlling a central data processor.

9. The monitor of claim 6 and means comprising cable harnesses for selectively connecting several of said display means to said monitor means.

10. The traffic monitor of claim 1 and noise immunity circuit means comprising means including a line relay for detecting closed loop direct current conditions on the subscriber line, limiting means for reducing the effect of any variations in line voltages applied to said line relay, means for delaying the release of said line relay, thereby holding said relay over interruptions in line current, and means for precluding a response to noise in the form of current fluctuations on said line.

11. The monitor of claim 1, wherein said monitor is electronic equipment, and means for precluding response by said electronic equipment to electromechanically caused noise on said line.

12. The monitor of claim 7 wherein said response precluding means comprises a monostable circuit having an integrating means coupled thereto for precluding response to electromechanical contact bounce and change over.

13. The monitor of claim 1 wherein each of said input connector means comprises at least a pair of line terminals, and means responsive to said scanner for bridging said pair of terminals to close a D.C. loop across said pair, said bridging means having a characteristic which interfaces with any of a variety of types of said finder-related equipments.

14. The monitor of claim 1 and identification means operated responsive to said scanner for supplying data to identify the finder group being operated when said dial tone appears, and means responsive to said identifying means for recording individual call data relating to said appearance of said dial tone.

15. The monitor of claim 14 and display means coupled to said traffic monitor for identifying a troubled finder group, matrix means for changeably and selectively connecting said traffic monitor to said display means whereby the identity of a linefinder group is known jointly from the connection made and from the identifying means.

16. The monitor of claim 15 and means associated with said display means for electronically accumulating data relating to said linefinder groups for controlling a central data processor.

17. A traffic monitor for a telephone switching system having a plurality of grouped finder-related equipments adapted to return dial tone to a calling subscriber line, said traffic monitor comprising a plurality of input connector means for connecting said monitor to individually associated vacant terminals in each of said finder groups, clock controlled scanner means for sequentially and individually connecting each of said connector means to said monitor at time based intervals and thereby originating a call to said switching system, means responsive to each originating call for detecting the appearance of dial tone as a function of time, means responsive to each of said scanner caused connections for recording at least the call attempts, means responsve to the dial tone detector for recording the appearance of dial tone as a function of time, a source of clock pulses for producing cyclically recurring pairs of said pulses, means for adjusting the time spacing between the pulses comprising said pairs of pulses to provide predetermined measured time periods, means responsive to each first of said pair of pulses for operating said scanner to make a connection and thereby place a call, means responsive to each second of said pair of pulses for operating the dial tone recording means, whereby said time function is measured by the time space between said pairs of pulses, each of said connector means comprises at least a pair of terminals, means including a high impedance coupled across said terminals when said connector means are operated for interfacing with a great variety of different types of equipment, each of said connector means comprising at least one contact making device interposed between each individually associated line and said monitor whereby closure of any of said contact making devices individualizes the associated line with the monitor, other contact means for thereafter completing a connection in said monitor to enable an energization of said line, whereby any sparks occur across said other contact means, said line monitor including a pair of test conductors having a D.C. detector and said dial tone detector means connected thereto, means in parallel with said high impedance for precluding response by said D.C. detector to momentary interruptions in said energization of said connectors, means in said test conductors for closing a circuit to energize said connectors, whereby said D.C. detector operates if said conductors are then energized, means responsive to operation of said D.C. detector for causing said recording of said attempt, means for measuring a time period, and means thereafter responsive to operation of said dial tone detector and said time measuring means for causing said recording of the appearance of said dial tone.

18. A line monitor circuit comprising a pair of test conductors having A.C. and D.C. detector means connected thereto, means for sequentially and individually connecting said test conductors to each of a plurality of other connectors, means in said test conductors for thereafter closing a circuit to energize said other conductors, whereby said D.C. detector operates if said other connectors are energized, means responsive to operation of said D.C. detector for recording an occurrence of said detection of energized connectors, means for measuring a time period, and means thereafter responsive to operation of said A.C. detector and said measuring means for recording the time of dial tone appearance as a function of said measured time period.

19. The line monitor of claim 18 wherein each of said other connectors comprises at least a pair of terminals, and means including a high impedance coupled across said terminals when said circuit closing means is operated for interfacing with a great variety of different types of equipment, and means in parallel with said high impedance for precluding response by said D.C. detector to momentary interruptions in said energization of said connectors.

20. The monitor of claim 18 and display means associated with said traffic monitor for identifying a troubled finder group, matrix means for changeably and selectively interconnecting said display means to said traffic monitor in a manner which identifies the line-finder group by the connection made, and means in said display means operated responsive to said detector means for recording data relating to said identified line-finder groups.

* * * * *